R. HARKNESS.
SEWER TRAP.
APPLICATION FILED JULY 22, 1914.
1,140,815.
Patented May 25, 1915.
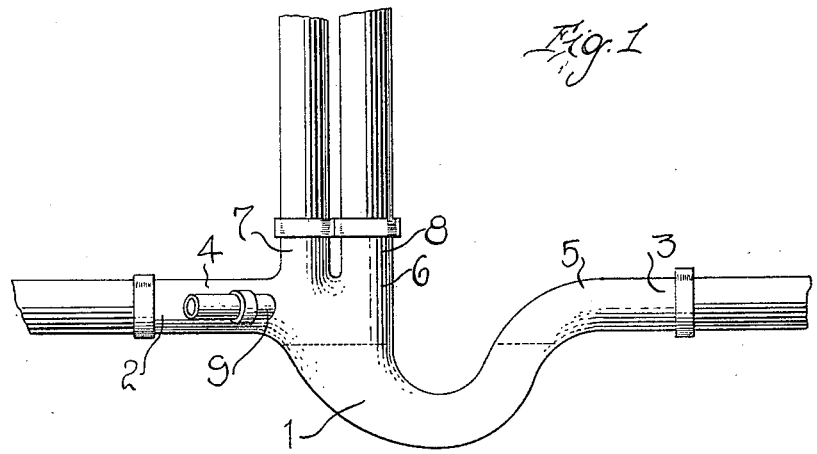
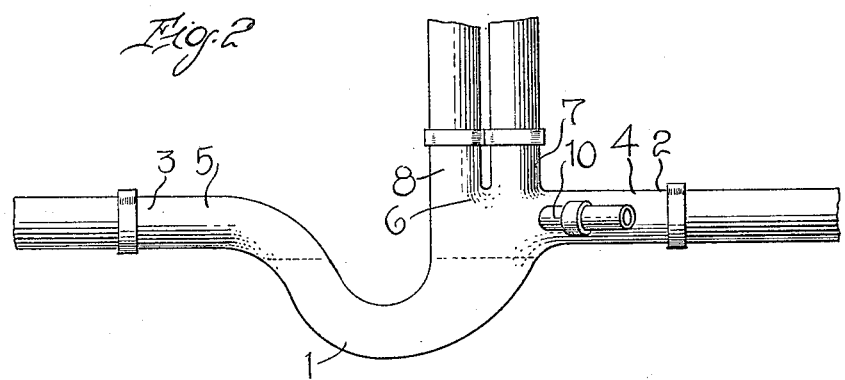
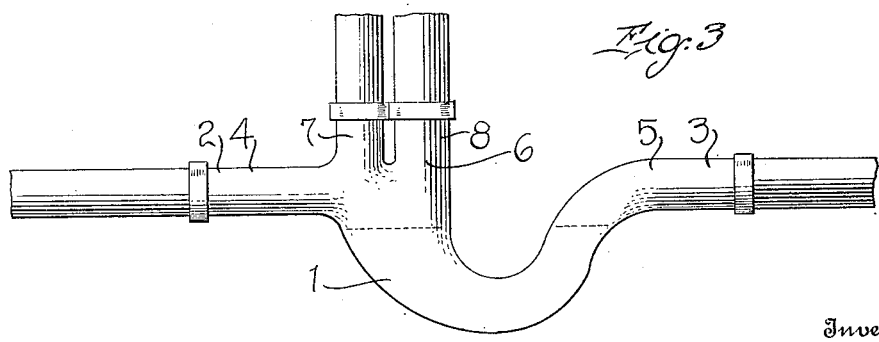
Inventor
ROSS HARKNESS

UNITED STATES PATENT OFFICE.

ROSS HARKNESS, OF ST. CLAIR HEIGHTS, MICHIGAN.

SEWER-TRAP.

1,140,815.

Specification of Letters Patent.

Patented May 25, 1915.

Application filed July 22, 1914. Serial No. 852,423.

*To all whom it may concern:*

Be it known that I, ROSS HARKNESS, citizen of the United States, residing at 901 Mont Clair avenue, St. Clair Heights, in the county of Wayne and State of Michigan, have invented certain new and useful Improvements in Sewer-Traps, of which the following is a specification, reference being had to the accompanying drawings.

This invention relates to sewer traps.

The object of the invention is to provide an article of this character that shall be simple in construction, and shall have its parts so constructed and arranged as not to be liable to become clogged, and which may be readily cleaned in case of stoppage, means being provided whereby the trap may be thoroughly ventilated, shall present a perfect water seal against escape of gas, shall afford unobstructed flow of water and sewage from the house to the sewer, and shall eliminate expensive fittings of pipe joints, thereby materially reducing the cost of plumbing the house.

With the above and other objects in view, as will appear as the nature of the invention is better understood, the same consists in the novel construction and arrangement of parts of a sewer trap, as will be hereinafter fully described and claimed.

In the accompanying drawings forming a part of this specification, and in which like characters of reference designate corresponding parts, Figure 1 is a view in side elevation of a right hand form of trap; Fig. 2 is a similar view of a left hand form of trap; Fig. 3 is a view similar to Fig. 1, but omitting one of the branches.

Referring to the drawings, and to Fig. 1 thereof, there is shown a trap whereby to provide a positive water seal 1 to prevent escape of gas, one end 2 of the trap being adapted for connection with the main soil pipe, and the other end 3 with the pipe leading to the sewer, the two branches 4 and 5 having their longitudinal axes in substantial alinement. The upper portion of the body of the trap is enlarged at one end and forms a chamber 6 which communicates with the water seal 1, and from which extend two branches 7 and 8, the former of which constitutes a fresh air vent and the latter a clean-out. Projecting from the chamber 6 and adjacent to and in line of the direction of the branch 4 is a third branch 9 that is designed for connection with a laundry tub. The form of trap just described is known as a right hand trap because the branch 9 is disposed on the right hand side thereof, while in the form shown in Fig. 2, the branch 10 for connection with the laundry tub is on the left hand side, and this latter form will be termed a left hand trap. With this exception, the traps are identical.

The form of trap shown in Fig. 3 is the same in all particulars as that shown in Figs. 1 and 2, except that the branch for connection with the laundry tub is omitted.

It will be obvious from the foregoing description that the traps herein described will result in a pronounced saving in the plumbing work, inasmuch as it takes the place of three fittings in making connections, and in installation saves the employment of two Y's and one eight bend besides the plumber's time in installing the parts.

It is intended that this trap shall be made of heavy cast iron, so that it shall be thoroughly durable in use, and may be constructed in a cheap and inexpensive manner.

Having thus described my invention, what I claim is:

1. A sewer trap having its terminals disposed substantially in alinement and its intermediate portion depressed to provide a water seal, one terminal of said intermediate portion being enlarged to form a chamber, said chamber having two upstanding branches which are disposed opposite the adjacent end of the water seal, one of the branches constituting a clean-out and the other a fresh air inlet, and a lateral branch extending from the chamber and constituting a connection for a laundry tub or the like.

2. A sewer trap having oppositely disposed terminals, and an intermediate portion disposed to provide a water seal, one end of the intermediate portion being enlarged to form a chamber, said chamber having two upstanding branches, one of the branches constituting a clean-out and the other a fresh air inlet.

In testimony whereof I hereunto affix my signature in the presence of two witnesses.

ROSS HARKNESS.

Witnesses:
RICHARD GREEN,
PERRY KEEVER.

Copies of this patent may be obtained for five cents each, by addressing the "Commissioner of Patents, Washington, D. C."